(12) United States Patent
Shin et al.

(10) Patent No.: US 11,366,323 B2
(45) Date of Patent: Jun. 21, 2022

(54) ELECTRONIC DEVICE FOR VA, AR, AND MR

(71) Applicant: LG ELECTRONICS INC., Seoul (KR)

(72) Inventors: Donghyok Shin, Seoul (KR); Bupsung Jung, Seoul (KR); Hoon Hur, Seoul (KR)

(73) Assignee: LG ELECTRONICS INC., Seoul (KR)

(*) Notice: Subject to any disclaimer, the term of this patent is extended or adjusted under 35 U.S.C. 154(b) by 357 days.

(21) Appl. No.: 16/490,063

(22) PCT Filed: May 2, 2019

(86) PCT No.: PCT/KR2019/005244
§ 371 (c)(1),
(2) Date: Aug. 29, 2019

(87) PCT Pub. No.: WO2020/222334
PCT Pub. Date: Nov. 5, 2020

(65) Prior Publication Data
US 2021/0356750 A1  Nov. 18, 2021

(51) Int. Cl.
*G02B 27/01* (2006.01)

(52) U.S. Cl.
CPC .. *G02B 27/0176* (2013.01); *G02B 2027/0154* (2013.01); *G02B 2027/0169* (2013.01)

(58) Field of Classification Search
CPC ............................ G02B 27/017; G02B 27/0176
See application file for complete search history.

(56) References Cited

U.S. PATENT DOCUMENTS

| | | | |
|---|---|---|---|
| 10,078,349 B1* | 9/2018 | Morris | G02B 27/0176 |
| 2017/0017085 A1 | 1/2017 | Araki et al. | |
| 2017/0090514 A1* | 3/2017 | Byun | G02B 27/0176 |
| 2017/0139215 A1 | 5/2017 | Tazbaz et al. | |
| 2019/0227329 A1* | 7/2019 | Han | G02B 27/0172 |
| 2020/0233213 A1* | 7/2020 | Porter | G02B 27/0176 |

FOREIGN PATENT DOCUMENTS

| | | | |
|---|---|---|---|
| JP | 2004233878 | 8/2004 | |
| KR | 1020190018518 | 2/2019 | |
| WO | WO-2018038281 A * | 3/2018 | ......... G02B 27/0172 |

OTHER PUBLICATIONS

PCT International Application No. PCT/KR2019/005244, International Search Report dated Jan. 31, 2020, 6 pages.

* cited by examiner

*Primary Examiner* — Alexander Eisen
*Assistant Examiner* — Cory A Almeida
(74) *Attorney, Agent, or Firm* — Lee Hong Degerman Kang Waimey

(57) ABSTRACT

An electronic device is disclosed. The electronic device comprises a goggle frame including at least one opening on a front surface thereof; a display positioned in front of the goggle frame and facing the at least one opening; a front cover coupled to the goggle frame and accommodating the display inside; a supporter positioned on a top surface of the front cover; and a main strap fixed to the supporter and made of an elastic material.

15 Claims, 22 Drawing Sheets

(a)

(b)

ELECTRONIC DEVICE FOR VA, AR, AND MR

CROSS-REFERENCE TO RELATED APPLICATIONS

This application is the National Stage filing under 35 U.S.C. 371 of International Application No. PCT/KR2019/005244, filed on May 2, 2019, the contents of which are all hereby incorporated by reference herein in its entirety.

TECHNICAL FIELD

The present invention relates to an electronic device. More particularly, the present invention relates to an electronic device used in virtual reality (VR), augmented reality (AR), mixed reality (MR), etc.

BACKGROUND ART

Virtual reality (VR) refers to a specific environment or situation which is similar to reality created by artificial technology using a computer, etc., but is not reality or the technology itself.

Augmented reality (AR) refers to technology that combines a virtual object or information with a real environment to make it look like an object in an original environment.

Mixed reality (MR) or hybrid reality refers to technology that combines a virtual world and a real world to make a new environment or new information. In particular, an interaction between in objects which exist in reality and virtuality in real time is referred to as the mixed reality.

In this case, a created virtual environment or situation stimulates five senses of a user and makes spatial and temporal experiences similar to the reality, thereby making the user freely enter a boundary between the reality and imagination. Further, the user is capable of interacting with objects implemented in such an environment, such as giving an operation or a command by using a device which actually exists in addition to immersion in such an environment.

In recent years, a research into a gear used in such a technical field has been actively conducted.

DISCLOSURE

Technical Problem

An embodiment of the present invention is to solve the problems and other problems. Another embodiment of the present invention may provide a speaker integrated electronic device.

Another embodiment of the present invention may provide an electronic device which may be easily worn on a head of a user.

Another embodiment of the present invention may provide an electronic device capable of changing a wearing mode corresponding to contents provided by a display module.

Technical Solution

According to an aspect of the present invention, provided is an electronic device including: a goggle frame including at least one opening on a front surface thereof; a display positioned in front of the goggle frame and facing the at least one opening; a front cover coupled to the goggle frame and accommodating the display inside; a supporter positioned on a top surface of the front cover; and a main strap fixed to the supporter and made of an elastic material.

According to another aspect of the present invention, the supporter may include a first strap connector and a second strap connector adjacent to each other in a left-right direction and tilted at a predetermined angle with respect to a first axis which extends in an up-down direction, the first strap connector and the second strap connector may be connected to one end and the other end of the main strap, respectively, and a distance between the first strap connector and the second strap connector may gradually increase toward a top end from a bottom end.

According to another aspect of the present invention, the first strap connector and the second strap connector may be symmetrical with respect to the first axis.

According to another aspect of the present invention, the electronic device may further include: a first hinge structure which couples the supporter and the front cover to be rotatable to each other, in which the first hinge structure may include at least one first fitting hole penetrating the front cover in the left-right direction, at least one second fitting hole penetrating the supporter in the left-right direction and facing the first fitting hole, and a fitting pin inserted into the first fitting hole and the second fitting hole.

According to another aspect of the present invention, the electronic device may further include: a hook positioned on a side surface of the front cover and capable of catching or hooking at least a portion of the main strap, in which the hook may be opened in a downward direction.

According to another aspect of the present invention, the electronic device may further include: a guide part disposed below the hook on the side surface of the front cover, in which the guide part is spaced apart from the hook by a predetermined interval to form an open part into which the main strap is inserted.

According to another aspect of the present invention, the electronic device may further include: an auxiliary strap connector positioned on the side surface of the front cover; an adapter detachably coupled to the auxiliary strap connector; and an auxiliary strap having one end fixed to the main strap and the other end fixed to the adapter.

According to another aspect of the present invention, the auxiliary strap connector may include a latch hole penetrating a thickness, and the adapter may include a first flange to which the auxiliary strap is fixed, a second flange facing the first flange and provided to be inserted into the latch hole, and a web connecting the first flange and the second flange.

According to another aspect of the present invention, the first flange may include a fixation hole to which the auxiliary strap is fixed, and an extension direction of the fixation hole may be tilted with respect to the extension direction of the web at a predetermined angle.

According to another aspect of the present invention, the auxiliary strap connector may be provided to rotate at a predetermined angle around a second axis which extends in the left-right direction.

According to another aspect of the present invention, the front cover may include a concave portion positioned on the side surface, one end of the auxiliary strap connector may be rotatably connected to the side surface of the front cover, the other end of the auxiliary strap connector may include a convex portion inserted into the concave portion and provided to move along a predetermined trajectory in response to rotation of the auxiliary strap connector, and a shape of the concave portion may correspond to the predetermined trajectory.

According to another aspect of the present invention, the concave portion may face the convex portion and include one surface having a pattern portion in which ridges and valleys are alternatively arranged, and the convex portion may include a stopper provided to move along the shape of the pattern portion in contact with the pattern portion.

According to another aspect of the present invention, the electronic device may further include: a first adhesive member positioned in the main strap; and a second adhesive member positioned in any one of the auxiliary strap and the adapter and provided to be detachable from the first adhesive member.

According to another aspect of the present invention, the plurality of first adhesive members may be arranged in a longitudinal direction of the main strap or the plurality of second adhesive members may be arranged in the longitudinal direction of the auxiliary strap.

According to another aspect of the present invention, the electronic device may further include: a facial pad positioned at a back of the front cover and exposing the opening, in which the facial pad may include a main pad having an internal space provided adjacent to the opening in the left-right direction, and an auxiliary pad inserted into the internal space.

According to another aspect of the present invention, the electronic device may further include: a second hinge structure which couples the auxiliary pad and the main pad to be rotatable to each other, in which the second hinge structure may include a coupling pin penetrating the auxiliary pad in the up-down direction and having one end and the other end fixed to the main pad, and a torsion spring coupled to the coupling pin and having one end supported on the main pad and the other end supported on the auxiliary pad to provide elastic force to the auxiliary pad when the auxiliary pad rotates.

Advantageous Effects

Effects of a display device according to the present invention will be described below.

According to at least one of embodiments of the present invention, an electronic device that may be easily worn on a head of a user may be provided.

According to at least one of embodiments of the present invention, since a wearing mode may be changed according to contents provided by a display module, a wearing sense (or facial fitting sense) may be controlled differently according to a condition. As a result, an electronic device capable of switching a wearing mode according to a use environment may be provided.

An additional range of an applicability of the present invention will be apparent from the following detailed description. However, since various changes and modifications can be clearly appreciated by those skilled in the art within the spirit and the scope of the present invention, the detailed description and a specific embodiment such as a preferred embodiment of the present invention should be appreciated as being just given as an example.

MODE FOR INVENTION

Figure 1:
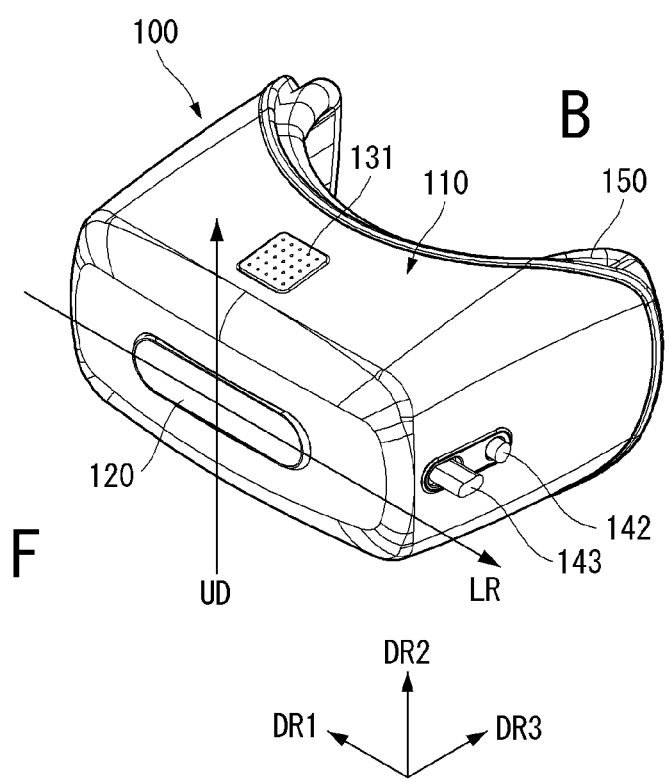
FIGS. 1 to 6 are diagrams illustrating a configuration of a display device according to the present invention.

Hereinafter, embodiments disclosed in this specification will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the specification only and do not have their own distinguished meanings or roles. Further, in describing the embodiment disclosed in this specification, a detailed description of related known technologies will be omitted if it is determined that the detailed description makes the gist of the exemplary embodiment disclosed in this specification unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

Moreover (referring to FIG. 1), hereinafter, a first direction DR1 may be a direction parallel to a longitudinal direction of an electronic device 100 and a second direction DR2 may be a direction parallel to is a height direction of the electronic device 100. A third direction DR3 may be a direction vertical to the first direction DR1 and/or the second direction DR2.

The first direction DR1 and the second direction DR2 may be collectively referred to as a horizontal direction. Moreover, the third direction DR3 may be referred to as a vertical direction.

When the electronic device 100 is viewed from a front F, a front side of the electronic device 100 may be faced. When the electronic device 100 is viewed from a back B, a rear side of the electronic device 100 may be faced.

When the electronic device 100 is viewed from the back B, a direction from a left side to a right side of the electronic device 100 or a direction from the right side to the left side may be referred to as a left-right direction LR. A direction from a top side to a bottom side of the electronic device 100 or a direction from the bottom side to the top side may be referred to as an up-down direction UD.

FIGS. 1 to 6 are diagrams illustrating a configuration of a display device according to the present invention.

Figure 2:
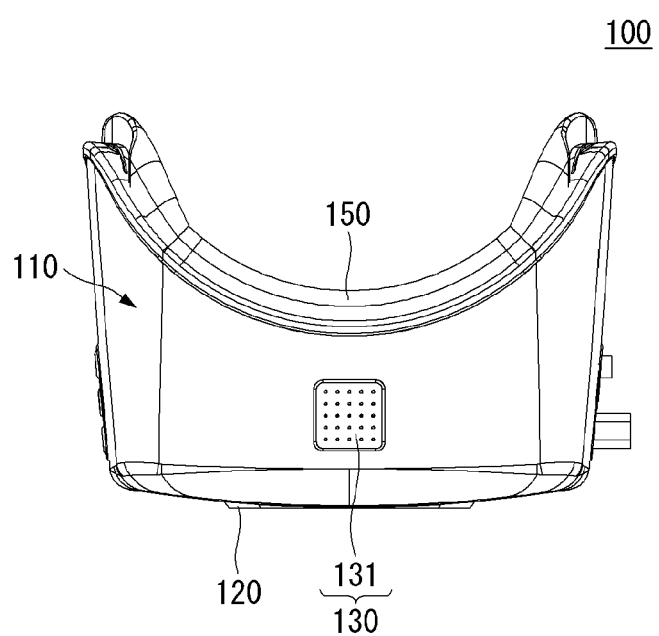
Figure 3:
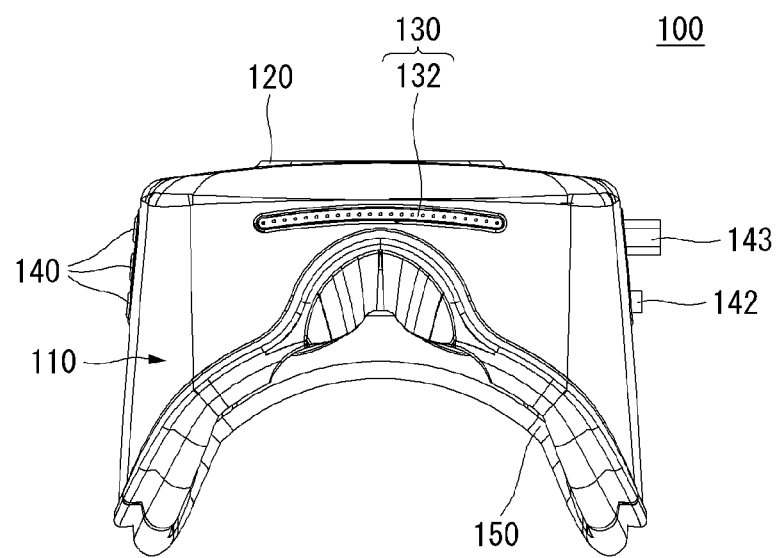

Referring to FIGS. 1 to 3, a front cover 110 may form an outline of an electronic device 100. The front cover 110 may have a tub shape. A window 120 may be mounted or formed on a front surface of the front cover 110. The window 120 may include a light transmissive material. A vent 130 may be mounted or formed on a top surface and/or a bottom surface of the front cover 110. A top vent 131 may have a square shape and may be positioned on the top surface of the front cover 110. A bottom vent 132 may have an elongated shape and may be positioned on the bottom surface of the front cover 110.

An operation unit 140 may be mounted or formed on a side surface of the front cover 110. The operation unit 140 may be a plurality of buttons. Input and output units 143 and 142 may be mounted on the side surface of the front cover 110. For example, the input unit 143 may be a USB terminal and the output unit 142 may provide a voice output.

The facial pad 150 may be coupled to the front cover 110 at the rear side of the front cover 110. The facial pad 150 may provide a convenient wearing sense to the face of the user and block light. For example, the facial pad 150 may have a shape corresponding to a contour of the front surface of the face of a person and provide a cushioning feeling.

The front cover 110 may be coupled to a frame 160 and may accommodate a display panel 172. The front cover 110 may be disposed to cover at least a part of the frame 160 on the front surface of the frame 160.

Figure 4:
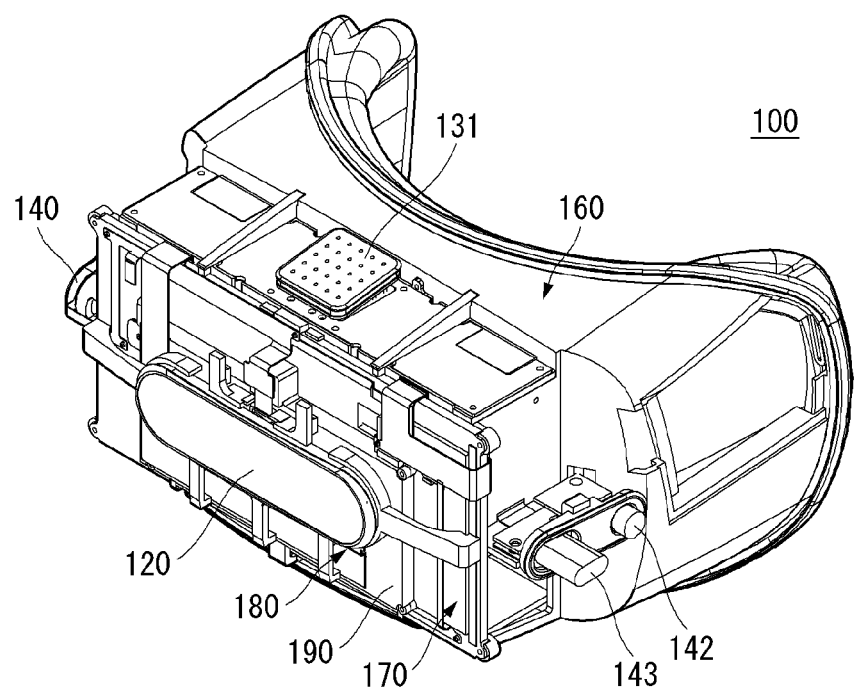
Figure 5:
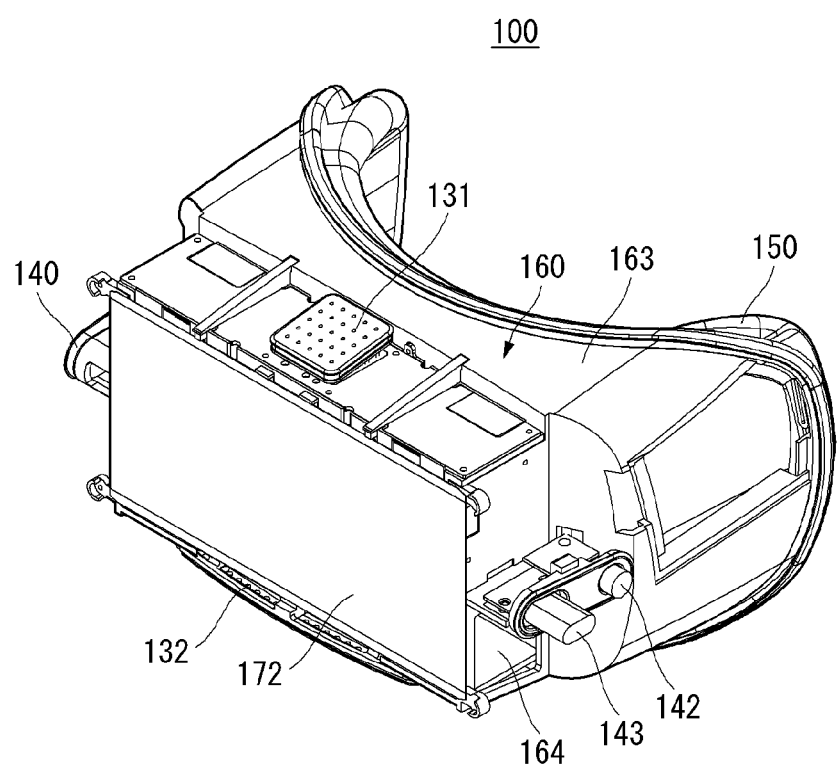
Figure 6:
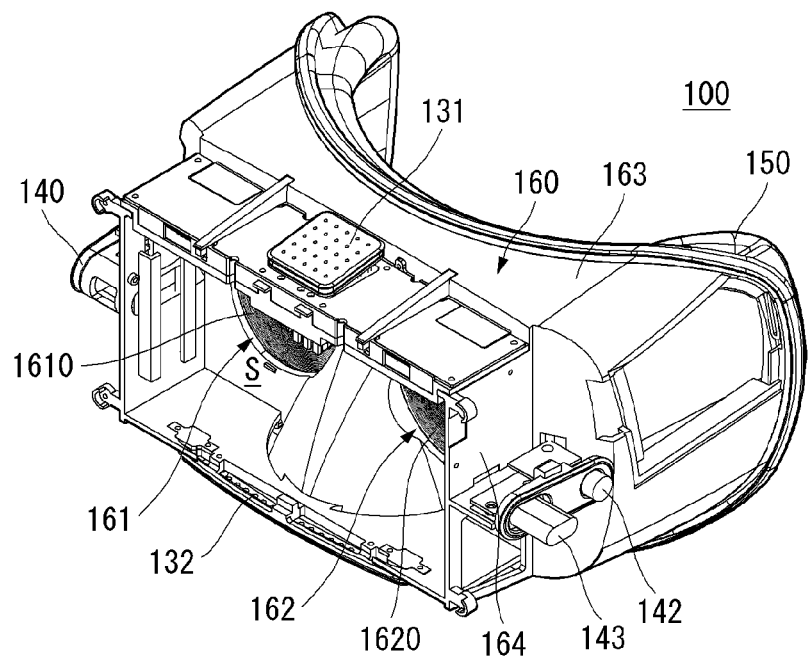

Referring to FIGS. 4 to 6, the frame 160 may be referred to as a goggle frame 160. The goggle frame 160 may have the tub shape as a whole and have openings 161 and 162 on the front surface. At least one of the openings 161 and 162 may be formed on the front surface of the goggle frame 160. Lenses 1610 and 1620 may block the openings 161 and 162.

The goggle frame 160 may include a body 163 and a box 164. The body 163 may have a tub shape, and the facial pad 150 may be mounted or fixed onto a rear inner side of the body 163. The openings 163 and 162 may be provided in plurality and may be formed on the front surface of the body 163. Positions of the openings 161 and 162 may correspond to the positions of eyes of the user. The box 164 may be positioned in front of the body 163 and positioned on circumferences of the openings 161 and 162. The openings 161 and 162 may be positioned between the body 163 and the box 164. The box 164 may provide a space S. The body 163 may be referred to as the goggle frame 160.

The front surface of the box 164 may be opened and the display panel 172 is positioned on the front surface of the box 164 to cover the space S of the box 164. The display module 170 may include the display panel 172 and is positioned on the front surface of the box 164 to cover the space S of the box 164. For example, the display module 170 may be an LCD module or an OLED module.

A camera module 180 may be mounted or fixed onto the front of the display module 170. The window 120 may cover the front of the camera module 180. A battery 190 may be positioned between the display module 170 and the camera module 180. The battery 190 may provide power to the electronic device 100. The battery 190 may be a secondary battery.

Figure 7:
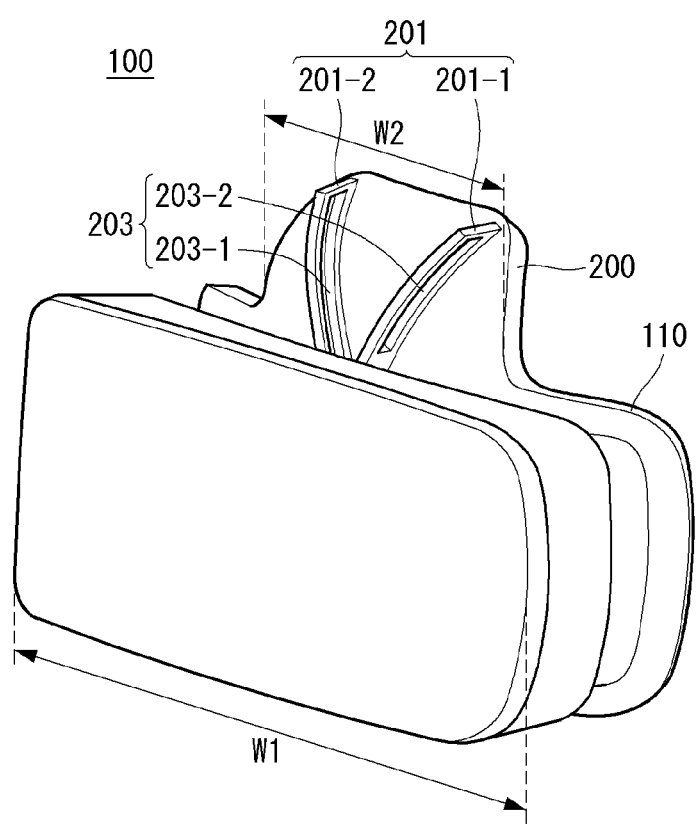
FIGS. 7 to 9 are diagrams illustrating an example of an electronic device according to an embodiment of the present invention.
Figure 8:
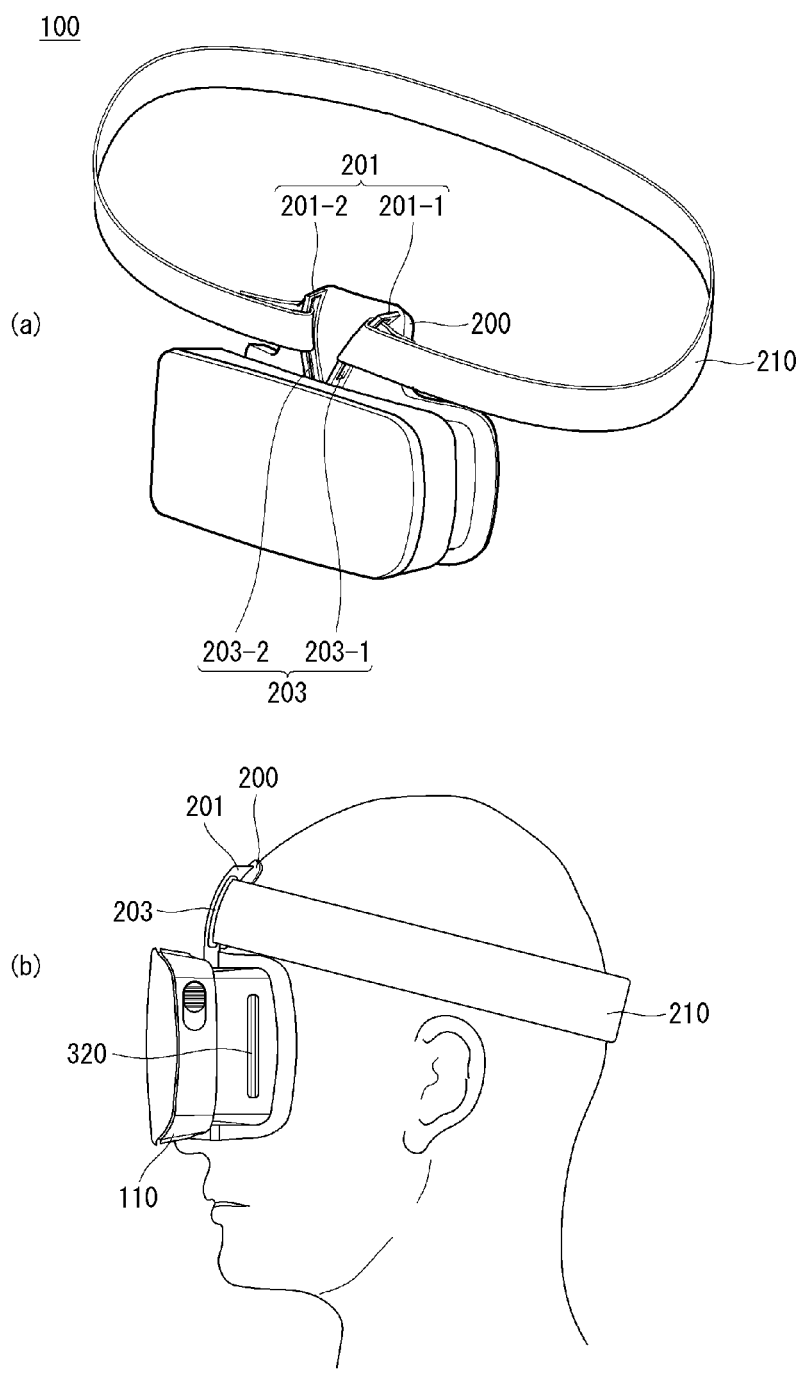
Figure 9:
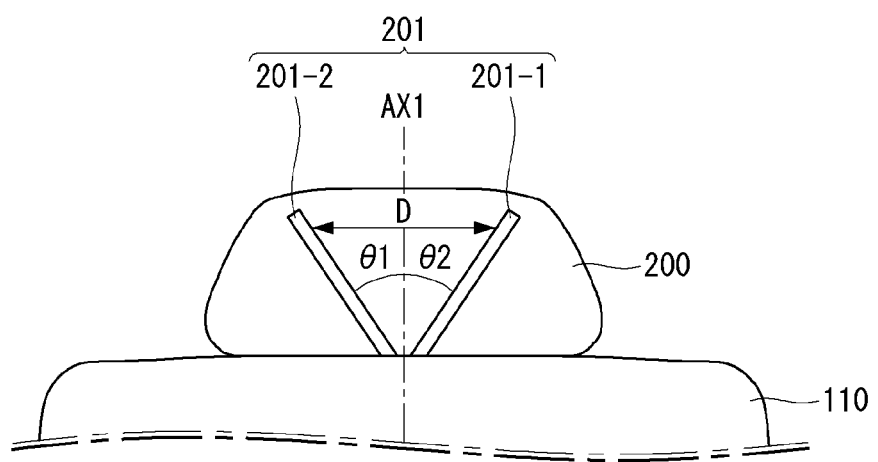

FIGS. 7 to 9 are diagrams illustrating an example of an electronic device according to an embodiment of the present invention.

Referring to FIGS. 7 and 8, the electronic device 100 may include a supporter 200 and a main strap 210. The supporter 200 may be mounted or formed on the front surface of the front cover 110. The supporter 200 may be positioned at the center of the top surface of the front cover 110. The supporter 200 may face a frontal head of the user. Alternatively, the supporter 200 may face a forehead (or a whole part) of the user.

Although not illustrated, an auxiliary pad 503 may be provided on the rear surface of the supporter 200. The auxiliary pad 503 may provide the cushioning feeling in direct contact with the frontal head or the forehead of the user when the user wears the electronic device 100. The auxiliary pad 503 may have a shape corresponding to the frontal head or the forehead of the user.

The main strap 210 may be fixed to the supporter 200. The main strap 210 may be worn onto a head part of the user. The main strap 210 may serve to fix the electronic device 100 to in place so that the electronic device 100 is not inadvertently detached while being worn on the head part of the user. The main strap 210 may be made of a material having a predetermined elasticity. The main strap 210 may provide the predetermined elasticity so that the electronic device 100 (e.g., facial pads 500 and 150) may be properly positioned on the face of the user and may be in close contact with a predetermined position.

The supporter 200 may include a strap connector 201 for fixing the main strap 210. The strap connector 201 may include a first strap connector 201-1 and a second strap connector 201-2. The first strap connector 201-1 and the second strap connector 201-2 may have a bar shape which elongates in one direction. The first strap connector 201-1 and the second strap connector 201-2 may be positioned adjacent to each other in the left-right direction.

The main strap 210 may have an open-loop shape in which one side is opened. One end of the main strap 210 may be fixed to the first strap connector 201-1 and the other end of the main strap 210 may be fixed to the second strap connector 201-2. The first strap connection portion 201-1 may include a first open hole 203-1 penetrating a thickness. One end of the main strap 210 may be inserted into the first open hole 203-1 to extend to cover the circumference of the first strap connector 201-1 and may be bonded to a part adjacent to one end of the main strap 210. Accordingly, one end of the main strap 210 may be fixed to the first strap connector 201-1. The first strap connection portion 201-2 may include a second open hole 203-2 penetrating the thickness. The other end of the main strap 210 may be inserted into the second open hole 203-2 to extend to cover the circumference of the second strap connector 201-2 and may be bonded to a part adjacent to the other end of the main strap 210. Accordingly, the other end of the main strap 210 may be fixed to the second strap connector 201-2.

Since the main strap 210 is fixed to the supporter 200 facing the forehead of the user, the main strap 210 may cover the forehead (or Frontal region) and a back (or Occipital region) of the head of the user when the main strap 210 is worn. Therefore, in contrast to a case where the main strap 210 is directly fixed to the left and right sides of the electronic device 100 (e.g., the left and right sides of the front cover 110), a facial pressure feeling (particularly, a pressure feeling which the user may feel on a main surface of an eyeball) which the user may feel may be minimized. That is, in a preferred embodiment of the present invention, when the electronic device 100 is worn, since a load applied to the face of the user, in particular, the vicinity of the eyeball may be reduced, the wearing sense may be significantly improved and an image immersion level through the electronic device 100 may be significantly improved.

The first strap connector 201-1 and the second strap connector 201-2 may extend in line in the up-down direction. In this case, as elastic force of the main strap 210 is concentrated on the supporter 200 positioned on the top surface of the electronic device 100, the bottom surface of the electronic device 100 is not in close contact with the face of the user but the bottom surface of the electronic device 100 is spaced from the face of the user.

Referring to FIG. 9, in order to prevent the above-described problem, the first strap connector 201-1 and the second strap connector 201-2 may be tilted at predetermined angles 81 and 82 with respect to a virtual center axis AX1. The virtual central axis AX1 may refer to a virtual axis crossing a space between the first strap connector 201-1 and the second strap connector 201-2 in the up-down direction. For example, a distance of the first strap connector 201-1 from the central axis AX1 may gradually increase toward a top end from a bottom end. The distance of the second strap connector 201-2 from the central axis AX1 may gradually increase toward the top end from the bottom end. In other words, a distance D between the first strap connector 201-1 and the second strap connector 201-2 may gradually increase in an upward direction. Here, the first strap connector 201-1 and the second strap connector 201-2 may be symmetrical to each other with respect to the central axis AX1, but the present invention is not limited thereto.

As such, as the first strap connector 201-1 and the second strap connector 201-2 are tilted, the elastic force provided by the main strap 210 may be relatively distributed toward the bottom surface of the electronic device 100. Accordingly, when the electronic device 100 is worn, a problem that the bottom surface of the electronic device 100 is lifted may be prevented, and as a result, the wearing sense of the electronic device 100 may be remarkably improved.

The supporter 200 may preferably have a width of ½ to ⅓ of the width of the front cover 110. When the width of the supporter 200 is larger than ½ of the width of the front cover 110, the main strap 210 may be lifted in an area adjacent to the supporter 200, such that an adhesion sense between the main strap 210 and the head part may deteriorate. When the width of the supporter 200 is smaller than ⅓ of the width of the front cover 110, an effective area of the supporter 200, which may be supported on the forehead of the user, is small, thereby reducing the wearing sense.

Figure 10:
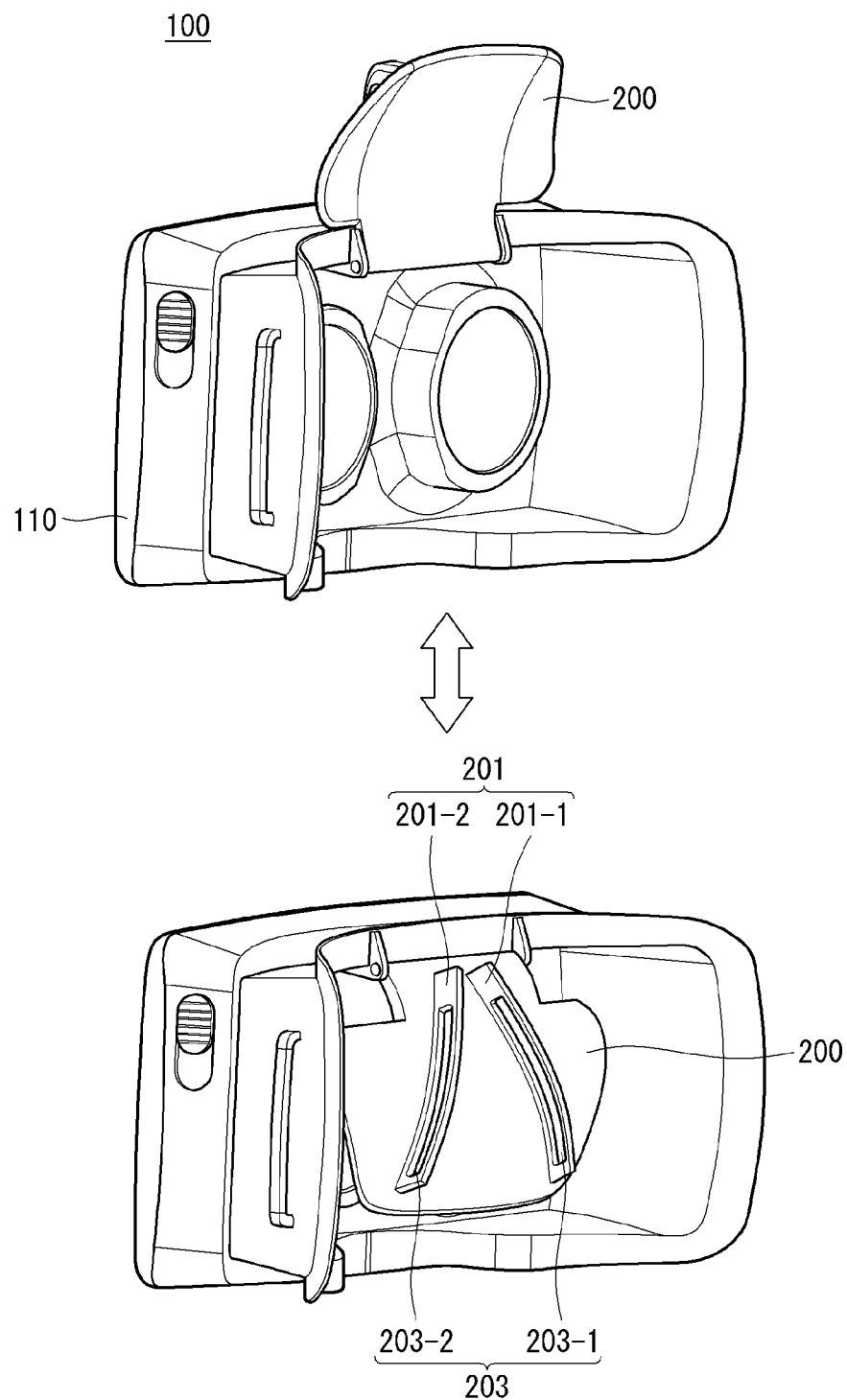
FIGS. 10 to 12 are diagrams illustrating a coupling example of a supporter and a front cover according to an embodiment of the present invention.
Figure 11:
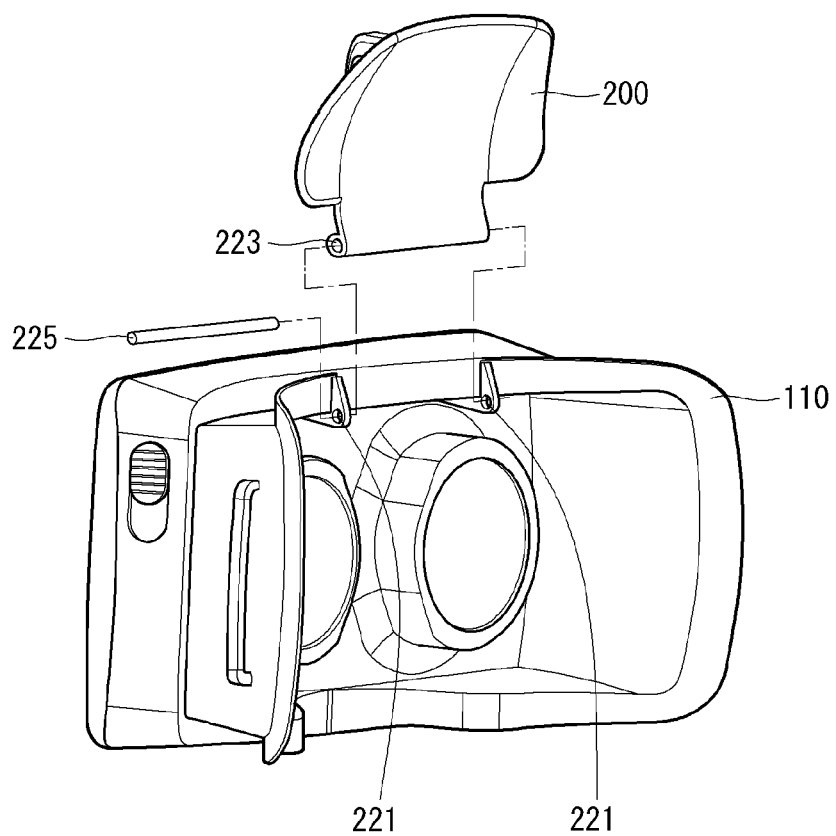
Figure 12:
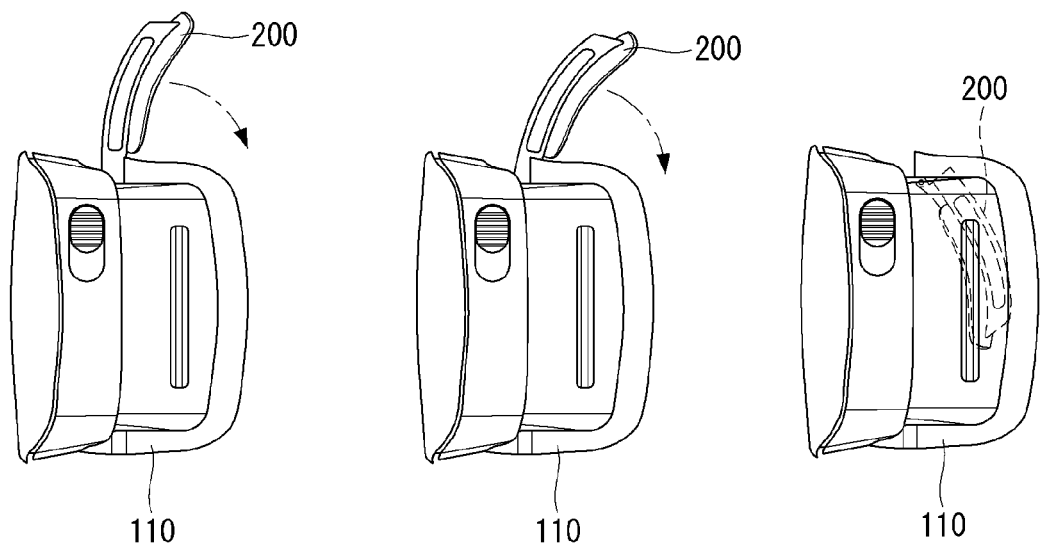

FIGS. 10 to 12 are diagrams illustrating a coupling example of a supporter and a front cover according to an embodiment of the present invention.

Referring to FIG. 10, the supporter 200 and the front cover 110 may be connected through a hinge structure. That is, the hinge structure may physically connect the supporter 200 and the front cover 110 to each other so that any one of the supporter 200 and the front cover 110 may be opened/closed while being folded by relatively pivoting with respect to the other one. For example, the supporter 200 may maintain a first state and a second state by rotating clockwise or counterclockwise with respect to an axis extending in the left-right direction. The first state may be a state in which the supporter 200 is folded to a space provided at the rear side of the front cover 110 and is not recognized in front of the electronic device 100. The first state may refer to a state when the electronic device 100 is not in use. The second state may be a state in which the supporter 200 is unfolded to the top surface of the front cover 110 and recognized in front of the electronic device 100. The second state may refer to a state when the electronic device 100 is in use.

Referring to FIGS. 11 and 12, the hinge structure may include a first fitting hole 221 provided in the front cover 110, a second fitting hole 223 provided in the supporter 200, and a fitting pin 225. The first fitting hole 221 and the second fitting hole 223 may be opened in the left-right direction and may face each other. The fitting pin 225 may be inserted into the first fitting hole 221 and the second fitting hole 223. An outer circumferential shape of the fitting pin 225 may correspond to inner circumferential shape of the first fitting hole 221 and the second fitting hole 223. The outer circumferential shape of the fitting pin 225 may be preferably implemented in a cylindrical shape which easily rotates due to characteristics of the hinge structure. In the figure, a case where two first fitting holes 221 are provided in the front cover 110, and one second fitting hole 223 positioned between the first fitting holes 221 is provided in the supporter 200 is illustrated as an example, but the present invention is not limited thereto.

As a result, the supporter 200 may rotate and horizontal and vertical movements may be limited, with respect to the front cover 110. The fitting pin 225 may provide predetermined frictional force in contact with an inner circumference of the first fitting hole 221 and the inner circumference of the second fitting hole 223. The movement of the supporter 200 may be limited at a desired position by the frictional force. That is, the supporter 200 may be controlled to be positioned at a desired position by the frictional force.

FIGS. 13 to 18 are diagrams illustrating examples of an auxiliary strap according to an embodiment of the present invention.

Figure 13:
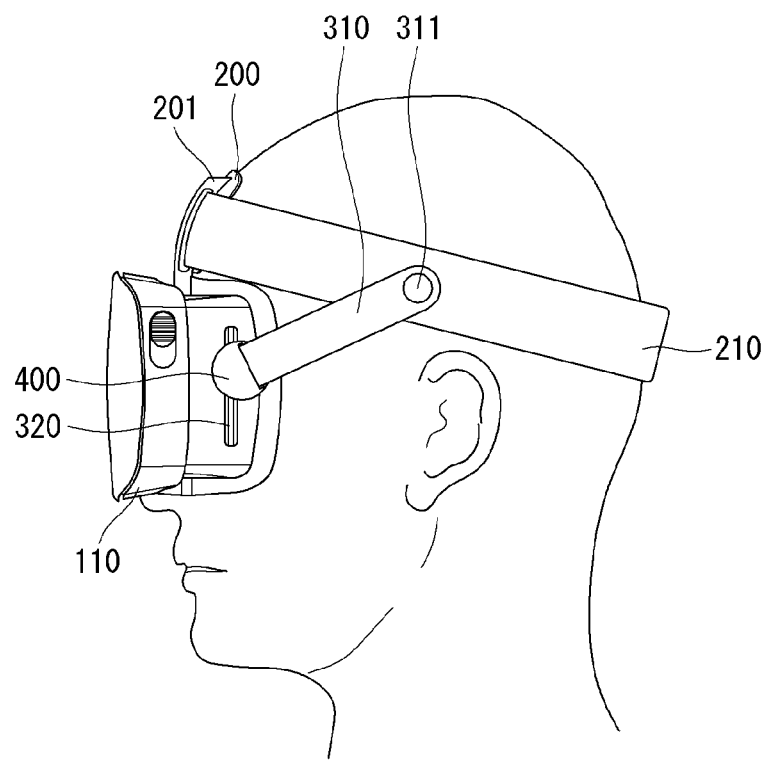
FIGS. 13 to 18 are diagrams illustrating examples of an auxiliary strap according to an embodiment of the present invention.

Referring to FIGS. 13 and 8, the electronic device 100 may include an auxiliary strap 310, an auxiliary strap connector 320, and an adapter 400.

The auxiliary strap 310 may be fixed to the main strap 210. That is, one end of the auxiliary strap 310 may be fixed to at least a part of the main strap 210. The auxiliary strap 310 may be made of a material having a predetermined elasticity. The auxiliary strap 310 may complement the elastic force of the main strap 210.

The auxiliary strap 310 may include a first auxiliary strap and a second auxiliary strap. A fixation unit 311 of the auxiliary strap 310 may be positioned to correspond to a side head and/or the back head of the user. As an example, the fixation units 311 of the first auxiliary strap and the main strap 210 may be positioned to correspond to any one of a right head and a left head of the user and the fixation units 311 of the second auxiliary strap and the main strap 210 may be positioned to correspond to the other one of the right head and the left head of the user. As another example, the fixation units 311 of the first auxiliary strap and the main strap 210 and the fixation units 311 of the second auxiliary strap and the main strap 210 may be positioned adjacent to each other at the position corresponding to the back head of the user. The auxiliary strap 310 may be rotatably coupled to the main strap 210 through the hinge structure.

The auxiliary strap connector 320 may be mounted or formed on the side surface of the front cover 110. The auxiliary strap connector 320 may include a first auxiliary strap connector and a second auxiliary strap connector. The first auxiliary strap connector may be positioned on any one of the right surface and the left surface of the front cover 110 and the second auxiliary strap connector may be positioned on the other one of the right surface and the left surface of the front cover 110.

The auxiliary strap connector 320 may include a latch hole 321 penetrating the thickness in a rear surface direction. The latch hole 321 may be surrounded by a circumference of the auxiliary strap connector 320. The adapter 400 may be detachably coupled to the auxiliary strap connector 320. A part of the adapter 400 may be provided in the form of a hook and connected to the latch hole 321 provided in the auxiliary strap connector 320.

Figure 14:
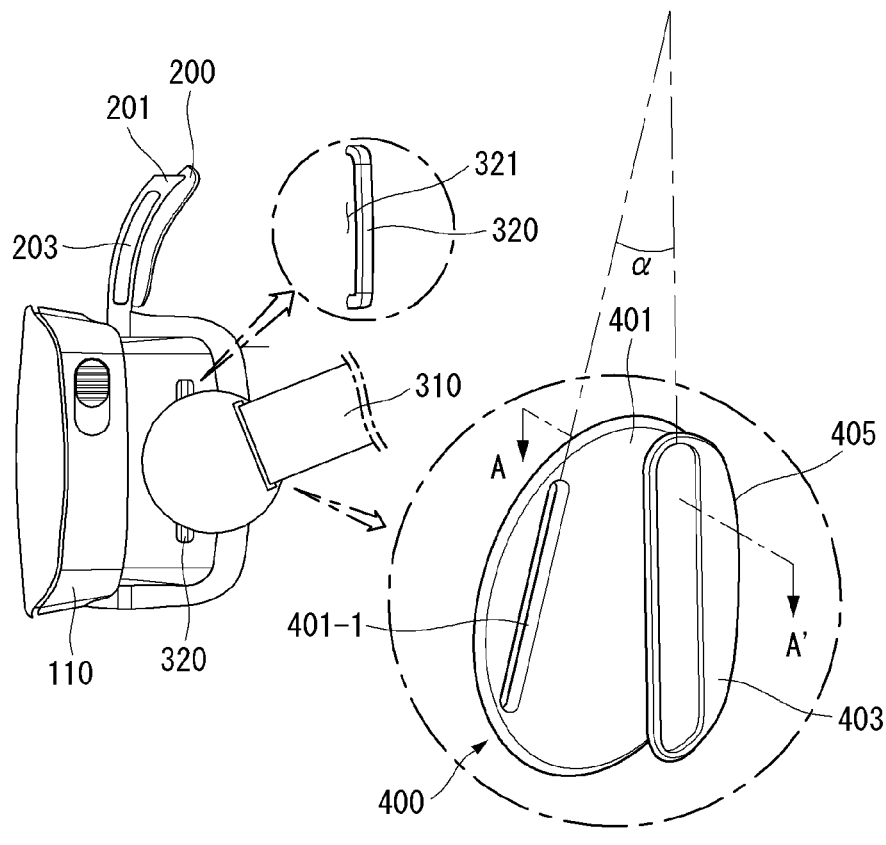
Figure 14:
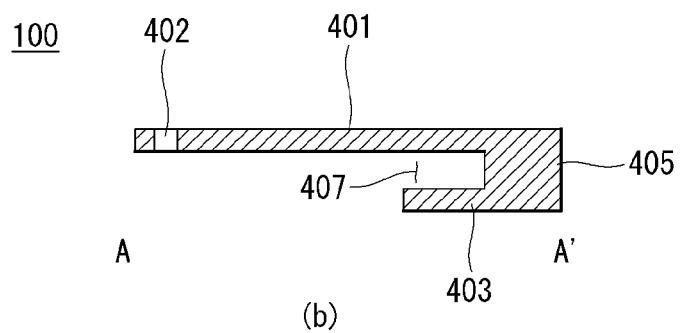

For example, referring to FIG. 14, the adapter 400 may include a first flange 401, a second flange 403, and a web 405 connecting the first flange 401 and the second flange 403. The cross section of the adapter 400 may have a "⊏" or "C" shape by a connection structure of the first flange 401, the second flange 403, and the web 405.

The first flange 401 may be fixed to the auxiliary strap 310. The adapter 400 may include a fixation hole 402 and the other end of the auxiliary strap 310 may be inserted into and fixed to the fixation hole 402.

The second flange 403 may face the first flange 401. The second flange 403 may be spaced apart from the first flange 401 and may extend in parallel with the first flange 401. An area of the first flange 403 may be smaller than the area of the first flange 401. The top end and/or bottom end of the second flange 403 may have a predetermined curvature. As the predetermined curvature is reflected on the top end and/or bottom end of the second flange 403, the coupling between the adapter 400 and the auxiliary strap connector 320 may be facilitated.

The adapter 400 may be latched and coupled to the auxiliary strap connector 320. That is, as the second flange 403 is inserted into the latch hole 321 provided in the auxiliary strap connector 320, the auxiliary strap connector 320 may be seated on an internal space 407 provided by the first flange 401, the second flange 403, and the web 405. Accordingly, the movement of the adapter 400 in the rear surface direction may be limited by the auxiliary strap connector 320. In a preferred embodiment of the present invention, the auxiliary strap 310 is selectively connected to the auxiliary strap connector 320, and as a result, the electronic device 100 may be more closely adhered to the face of the user as compared with a case where only the main strap 210 is used.

In a preferred embodiment of the present invention, the user may wear the electronic device 100 in another mode according to the contents provided by the display module 170. For example, a first mode may be a mode which the user may perform when receiving static contents such as watching a move, etc. The first mode may be a mode in which since the auxiliary strap 310 is not connected to the auxiliary strap connector 320, the facial adhesion sense of the electronic device 100 is relatively weak. A second mode may be a mode which the user may perform when receiving dynamic contents such as game play, etc. The second mode may be a mode in which since the auxiliary strap 310 is connected to the auxiliary strap connector 320, the facial adhesion sense of the electronic device 100 is relatively strong.

An extension direction (or longitudinal direction) of the web 405 may be tilted at a predetermined angle α with respect to the extension direction (or longitudinal direction of the fixation hole 402. For example, the web 405 may gradually move away from the fixation hole 402 from the top end to the bottom end. As illustrated, when the adapter 400 is coupled to the auxiliary strap connector 320, the extension direction of the fixation hole 402 may correspond to a direction perpendicular to a direction in which the auxiliary strap 310 extends. Here, in order for the auxiliary strap connector 320 to be stably seated on the adapter 400, it is necessary to secure a sufficient contact area between the auxiliary strap connector 320 and the web 405. In a preferred embodiment of the present invention, the extension direction of the web 405 is tilted at the predetermined angle α relative to the extension direction of the fixation hole 402, so that the sufficient contact area between the auxiliary strap connector 320 and the web 405 may be secured, thereby providing a stable fastening structure between the auxiliary strap connector 320 and the adapter 400.

Figure 15:
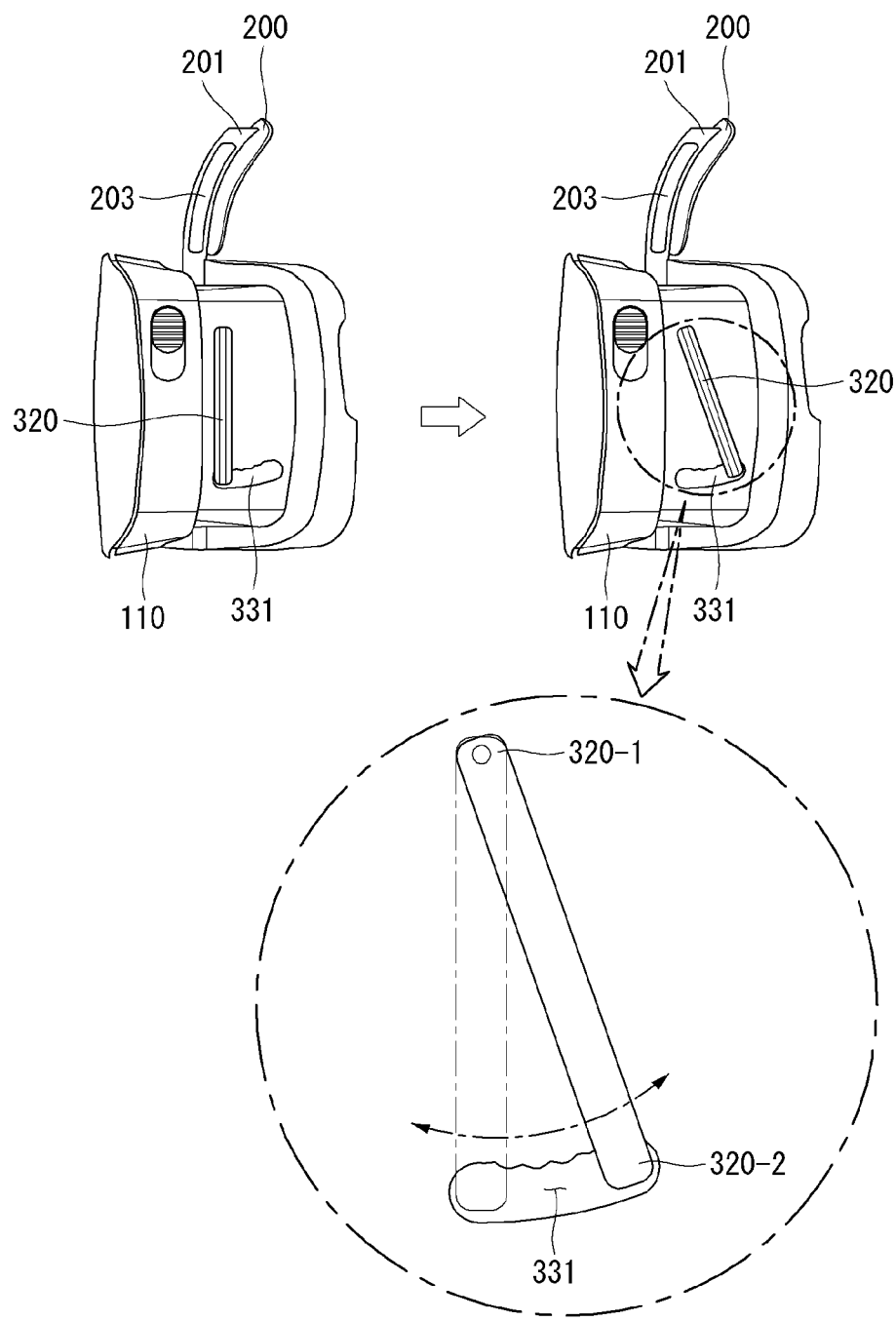
Figure 16:
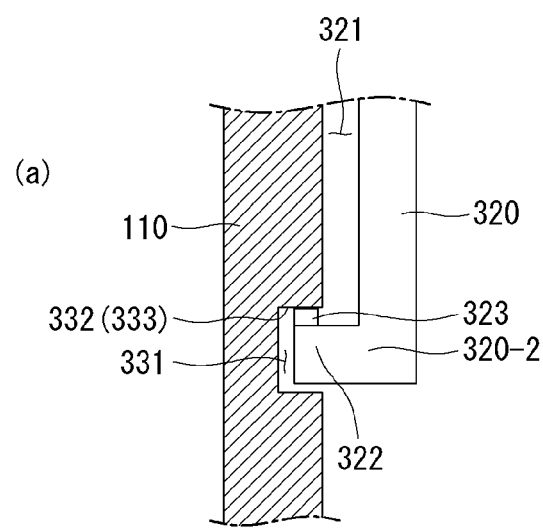
Figure 16:
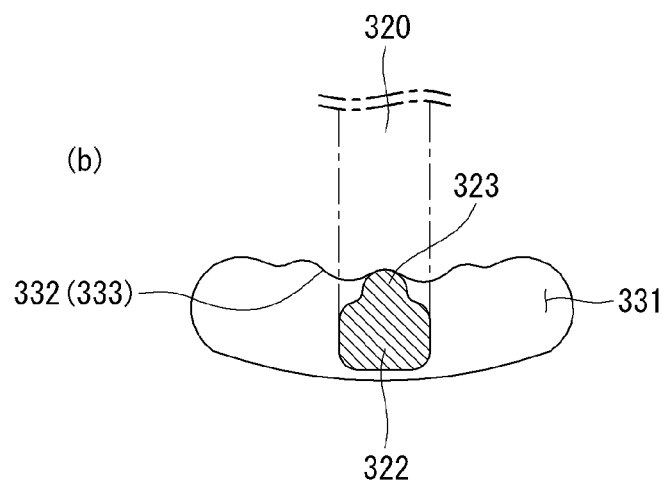

Referring to FIGS. 15 and 16, the auxiliary strap connector 320 may be provided on the side surface of the front cover 110 to be rotatable by a predetermined angle. That is, the auxiliary strap connector 320 may be rotatably provided based on a virtual axis which extends in the left-right direction.

One end 320-1 of the auxiliary strap connector 320 may be rotatably connected to the side surface of the front cover 110. The other end 320-2 of the auxiliary strap connector 320 may be movably connected to the side surface of the front cover 110 along a predetermined trajectory. The other end 320-2 of the auxiliary strap connector 320 may include a convex portion 322 which protrudes toward the side surface of the front cover 110. A concave portion 331 into which the convex portion 322 may be movably inserted may be formed on the side surface of the front cover 110. The concave portion 331 may be provided by partially recessing the side surface of the front cover 110 in the thickness direction. The shape of the concave portion 331 may correspond to the predetermined trajectory. The concave portion 331 may guide a movement path (or rotation path) of the auxiliary strap connector 320 and limit the movement of the auxiliary strap connector 320 in response to whether to provide external force.

As an example, the concave portion 331 may include a pattern portion 333 provided on one surface 332 facing the convex portion 322 in the up-down direction. The pattern portion 333 may have a shape in which round ridges and valleys are alternately arranged. Arrangement directions of the ridge and the valley may correspond to a moving direction of the convex portion 322. The convex portion 322 may include a stopper 323 provided on a surface facing the pattern portion 333 in the up-down direction. The stopper 323 may be provided to have a shape protruding toward one end of the auxiliary strap connector 320, and one end thereof may contact the pattern portion 333. The stopper 323 may be made of an elastic material. The stopper 323 may be a plate-shaped spring and may correspond to the shape of the pattern portion 333. When the user applies the external force in order to rotate the auxiliary strap connector 320, the stopper 323 may move along the pattern portion 333. When the external force is released, the stopper 323 is positioned at the valley at a specific position of the pattern portion 333, the movement of the auxiliary strap connector 320 may be limited.

Figure 17:
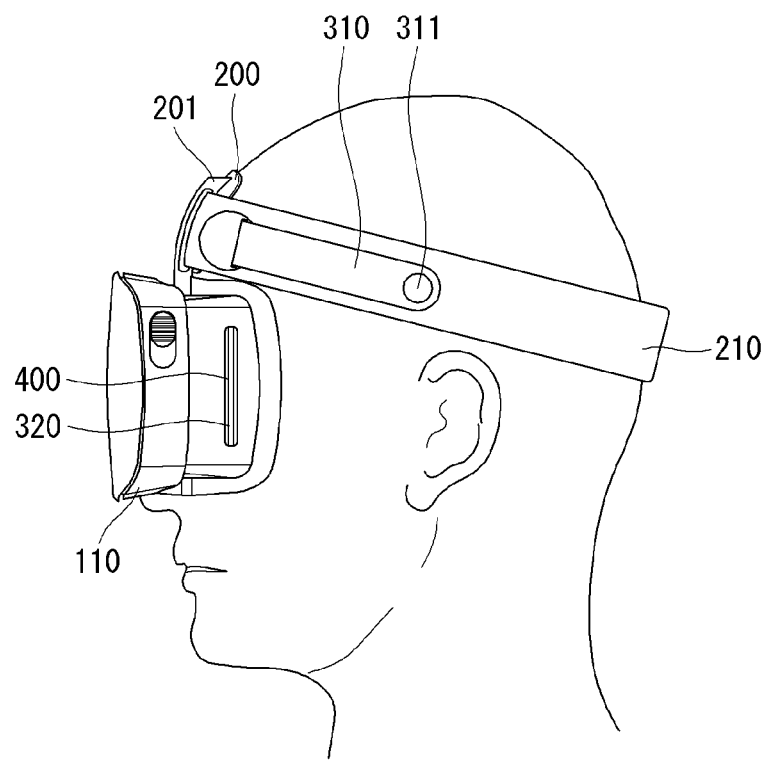
Figure 18:
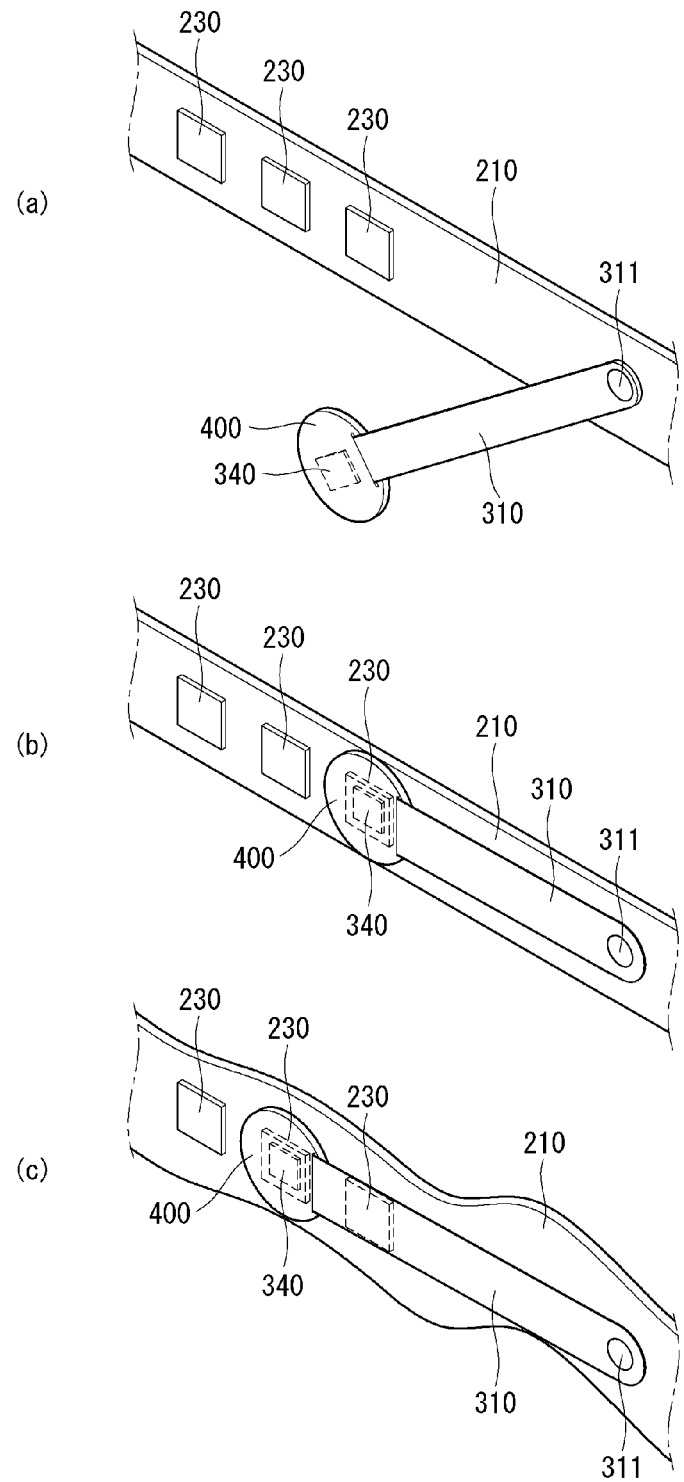

FIGS. 17 and 18 are diagrams illustrating a coupling example of a main strap and an auxiliary strap according to an embodiment of the present invention.

Referring to FIGS. 17 and 18, the other end of the auxiliary strap 310 may be detachably attached to the main strap 210 through adhesive members 230 and 340. And/or the adapter 400 fixed to the other end of the auxiliary strap 310 may be detachably attached to the main strap 210 through the adhesive members 230 and 340. Hereinafter, for convenience of description, a case where the adhesive members 230 and 340 are provided in the main strap 210 and the adapter 400 will be described as an example. The adhesive members 230 and 340 may be Velcro or magnets, but are not limited thereto.

For example, the main strap 210 may include first adhesive members 230 disposed at different positions. The first adhesive members 230 may be sequentially arranged along the longitudinal direction of the main strap 210. The adapter 400 may include a second adhesive member 340 that is detachable from the first adhesive member 230. If necessary, the user may selectively attach the first adhesive member 230 attached to the adapter 400 to at least one of the second adhesive members 340. According to an attachment position of the first adhesive member 230, the degree of elastic force provided to the main strap 210 may be controlled. That is, since the user may control the degree of elastic force of the auxiliary strap 310 by selecting the attachment position of the first adhesive member 230, the user may selectively complement the elastic force of the main strap 210 according to a required degree.

Hereinabove, an embodiment in which there is a plurality of first adhesive members 230 and the second adhesive member 340 is selectively attached to the first adhesive members 230 has been described as an example, but is not limited thereto. As another example, there may be a plurality of second adhesive members 340 and the first adhesive member 230 may be selectively attached to the second adhesive member 340. In this case, the second adhesive member 340 may be selectively disposed at different positions of the adapter 400 and/or the auxiliary strap 310.

Figure 19:
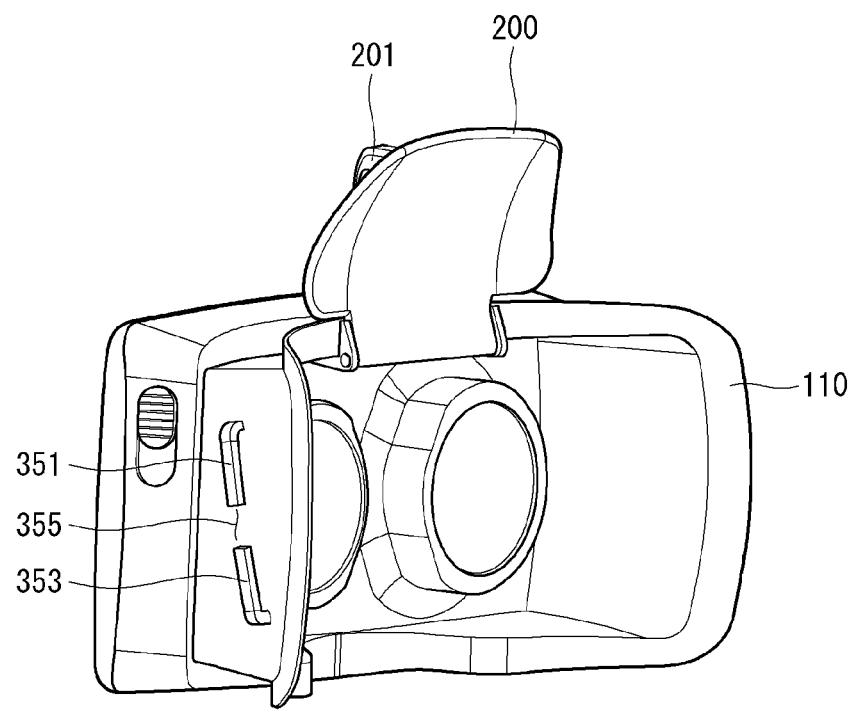
FIGS. 19 and 20 are diagrams illustrating a connection example of a main strap according to an embodiment of the present invention.
Figure 20:
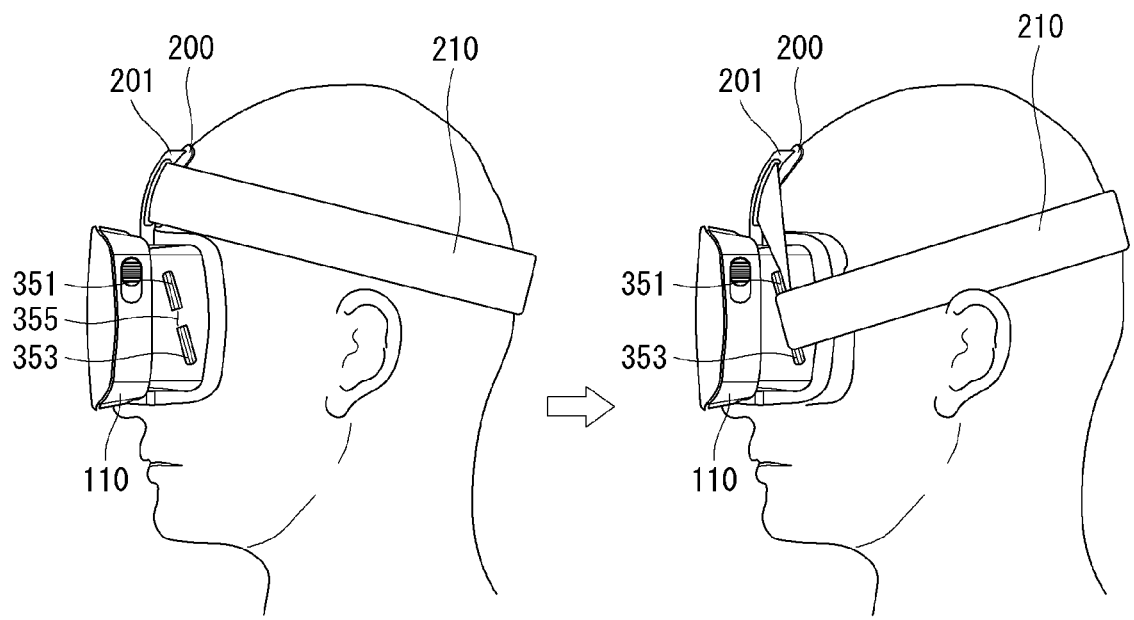

FIGS. 19 and 20 are diagrams illustrating a connection example of a main strap according to an embodiment of the present invention.

Referring to FIGS. 19 and 20, the electronic device 100 may include a hook 351. The hook 351 may be provided to hold or hook at least a portion of the main strap 210 that extends while being fixed to the supporter 200 according to a need of the user. The hook 351 may be mounted or formed on the side surface of the front cover 110. The hook 351 may be mounted or formed on the left surface or the right surface of the front cover 110. The hook 351 may be open downward. The main strap 210 fixed to the supporter 200 is hooked on the hook 351, and as a result, the upward movement may be limited.

The electronic device 100 may further include a guide part 353. The guide part 353 may be mounted or formed on the side surface of the front cover 110. The guide part 353 may be disposed below the hook 351. The guide part 353 may be disposed to face the hook 351 and the guide part 353 and the hook 351 are spaced apart from each other to form an open part 355. The open part 355 may be a path into which at least a portion of the main strap 210 is inserted. The guide part 353 may guide a fastening direction of the main strap 210 by controlling the position of the open part 355 and control the size of the open part 355 to prevent undesired separation of the main strap 351 connected to the hook 351. In the figure, a case where the guide part 353 has a shape corresponding to the hook 351 and is provided to be open upward is illustrated as an example, but the present invention is not limited thereto. When the guide part 353 is provided to be open upward, a portion of the main strap 210 may also be inserted into the inside of the guide part 353.

As the main strap 210 fixed to the supporter 200 is hooked on the hook 351, the main strap 210 extends around the eyeball of the user to cover the side head and the rear head. In this case, when the main strap 210 is not connected to the hook 351 to cover the forehead and the back head of the user, the electronic device 100 may be in closer contact with the face of the user.

In a preferred embodiment of the present invention, the user may wear the electronic device 100 in another mode according to the contents provided by the display module 170. For example, a first mode may be a mode which the user may perform when receiving static contents such as watching a move, etc. The first mode may be a mode in which since the main strap 210 is not connected to the hook 351, the facial adhesion sense of the electronic device 100 is relatively weak. A second mode may be a mode which the user may perform when receiving dynamic contents such as game play, etc. The first mode may be a mode in which since the main strap 210 is connected to the hook 351, the facial adhesion sense of the electronic device 100 is relatively strong.

Figure 21:
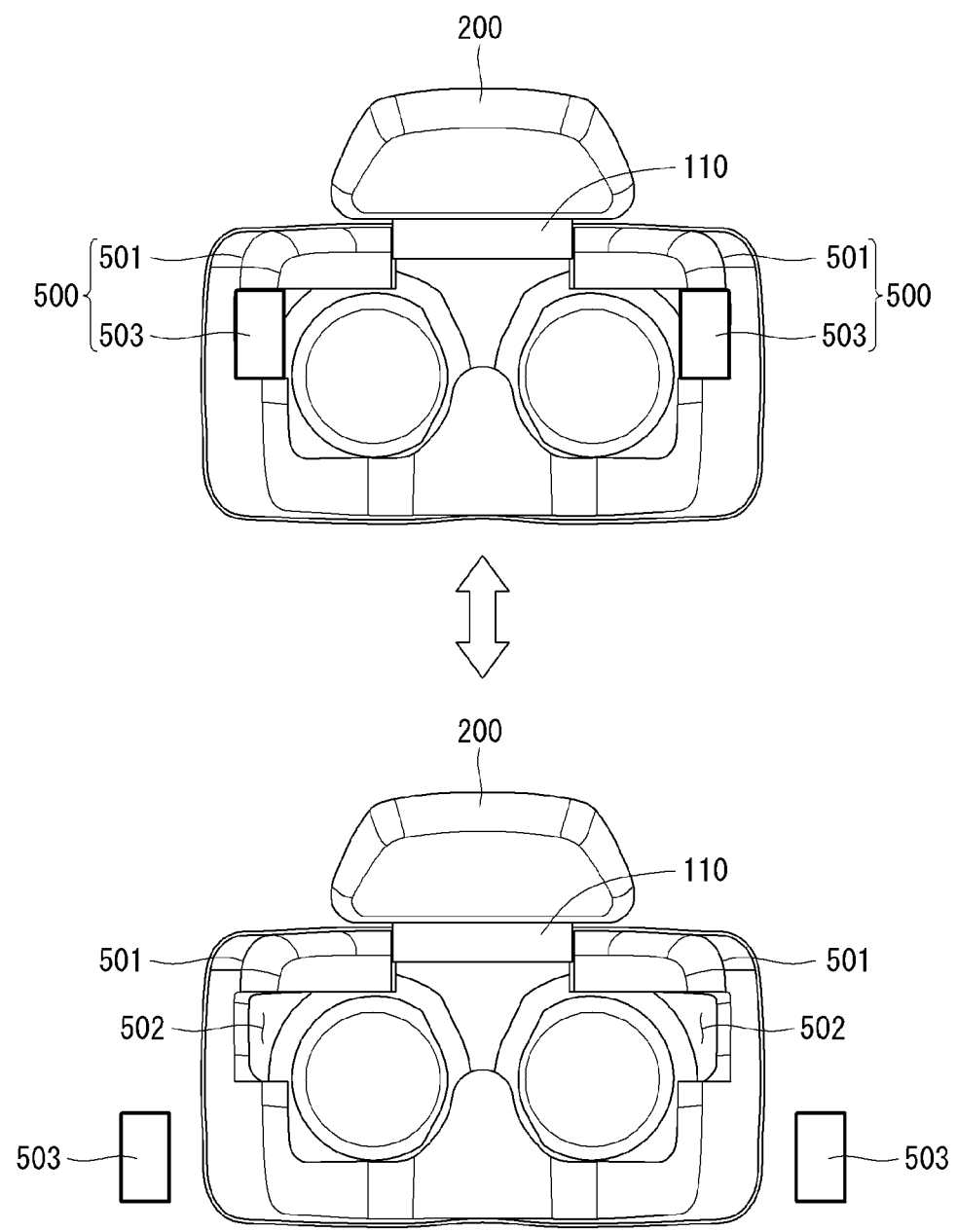
FIGS. 21 and 22 are diagrams illustrating examples of facial pads according to an embodiment of the present invention.
Figure 22:
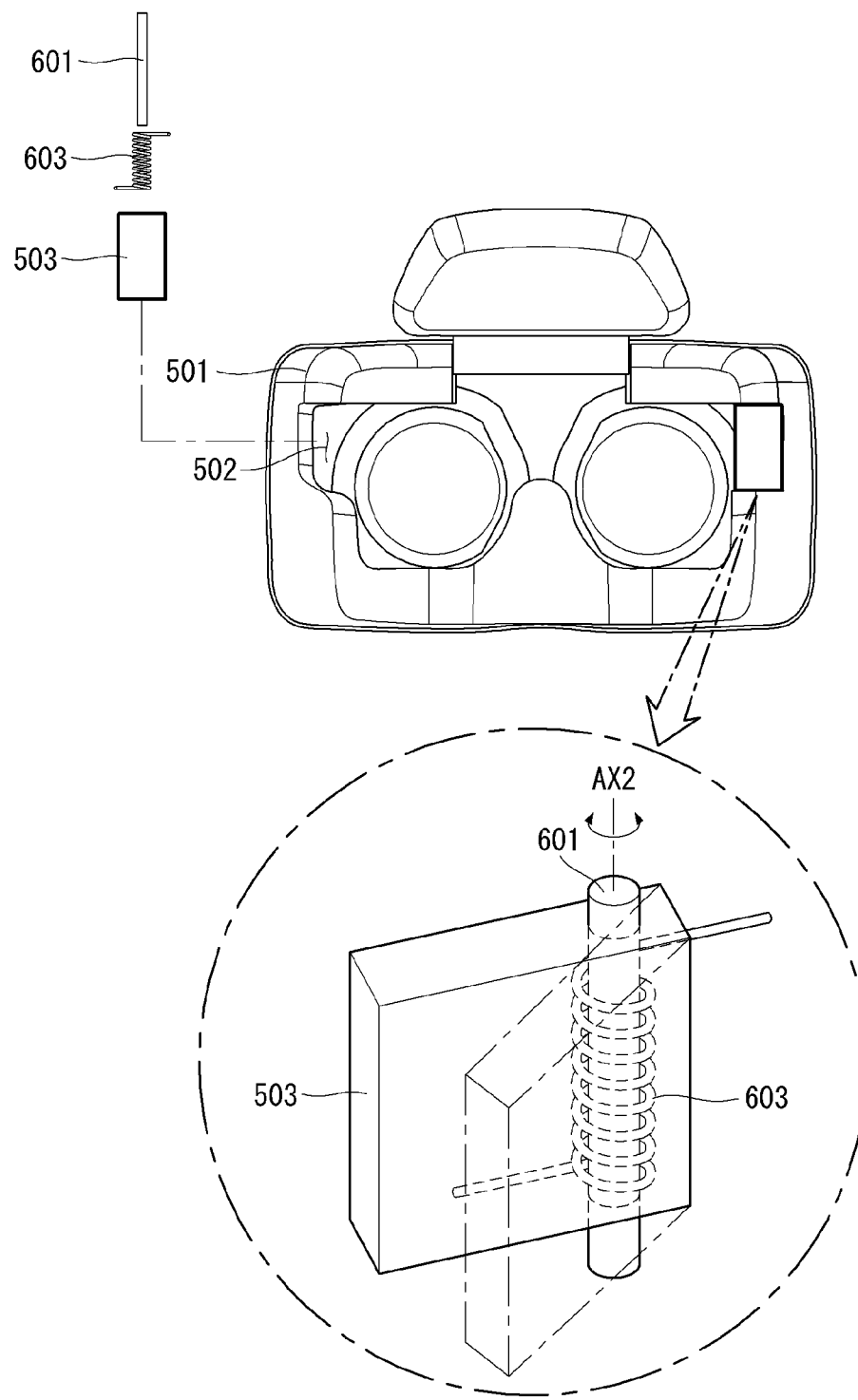

FIGS. 21 and 22 are diagrams illustrating examples of facial pads according to an embodiment of the present invention.

Referring to FIGS. 21 and 20, the electronic device 100 may include a facial pad 500.

The facial pad 500 may be mounted or formed at the back of the front cover 110. The facial pad 500 may be provided to be positioned between the front cover 110 and the face of the user when the electronic device 100 is worn. The facial pad 500 may have a shape corresponding to the face of the user. The facial pad 500 may provide the cushioning feeding to the user when the electronic device 100 is worn. The facial pad 500 may block light when the electronic device 100 is worn. Most of the center of the facial pad 500 penetrates to expose the openings 161 and 162 (see FIG. 6).

The facial pad 500 may include a main pad 501 and an auxiliary pad 503. The facial pad 501 may be provided to correspond to most of the face of the user. The main pad 501 may include an internal space 502 open at both sides in an area adjacent to the eyeball of the user. The internal space 502 may be positioned adjacent to the openings 161 and 162 of FIG. 6 in the left-right direction.

The auxiliary pad 503 may be inserted into the internal space 502 of the main pad 501. The auxiliary pad 503 may be detachably provided in the internal space 502 of the main pad 501. Further, the auxiliary pad 503 may be provided to have a predetermined elasticity and fitted to the main pad 501.

The auxiliary pad 503 is detached from the main pad 501 to open the internal space 502. The auxiliary pad 503 is coupled to the main pad 501 to close the internal space 502. The internal space 502 may be an area where a part of a frame of glasses worn by the user is seated. Accordingly, a preferred embodiment of the present invention has an advantage that the user wearing glasses may also easily wear the electronic device 100 without being limited by the space.

Referring to FIG. 22, the auxiliary pad 503 may be connected to the main pad 501 through the hinge structure. The hinge structure may physical connect the auxiliary pad 503 and the main pad 501 so that the auxiliary pad 503 may be opened and closed while being folded by relatively pivoting to the main pad 501 around a one-side point. For example, the auxiliary pad 503 rotates clockwise or counterclockwise around a central axis AX2 which extends in the up-down direction to maintain each of opening and closing states.

As an example, the hinge structure may include a coupling pin 601. The coupling pin 601 may penetrate the auxiliary pad 503 and one end and the other end of the coupling pint 601 may be fixed to the main pad 501. The coupling pin 601 may extend in the up-down direction. The outer circumferential shape of the coupling pin 601 may be preferably implemented in the cylindrical shape which easily rotates due to the characteristics of the hinge structure.

As a result, the auxiliary pad 503 may rotate around the central axis AX2 of the coupling pin 501 and horizontal and vertical movements may be limited, with respect to the main pad 501. The auxiliary pad 503 may be fitted to the main pad 501 and the movement of the auxiliary pad 503 may be limited at a desired position by the frictional force between the auxiliary pad 503 and the main pad 501. That is, the auxiliary pad 503 may be controlled to be positioned at the desired position by the frictional force.

The hinge structure may further include a torsion spring 603. The torsion spring 603 may provide the elastic force (or repulsive force) using torsion when the auxiliary pad 503 rotates. The torsion spring 603 may be embedded in the auxiliary pad 503. The torsion spring 603 may be fitted to the coupling pin 601 to provide elasticity in the rotational direction. For example, one end of the torsion spring 603 may be supported by the main pad 501, and the other end thereof may be supported by the auxiliary pad 503. Both ends of the torsion spring 603 are supported on the main pad 501 and the auxiliary pad 503, respectively to provide elasticity for rotating the auxiliary pad 503 in a direction in which the auxiliary pad 503 is closed, that is, one direction with respect to the central axis AX2 of the coupling pin 601.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An electronic device comprising:
   a goggle frame including at least one opening on a front surface thereof;
   a display positioned in front of the goggle frame and facing the at least one opening;
   a front cover coupled to the goggle frame and accommodating the display inside;
   a supporter positioned on a top surface of the front cover; and
   a main strap fixed to the supporter and made of an elastic material,
   wherein the supporter includes a first strap connector and a second strap connector adjacent to each other in a left-right direction with respect to a first axis which extends in an up-down direction,
   wherein the first strap connector and the second strap connector are tilted in the left-right direction at opposite and equal predetermined angles,
   wherein a distance between the first strap connector and the second strap connector gradually increases toward a top end from a bottom end, and
   wherein the first strap connector and the second strap connector are connected to one end and the other end of the main strap, respectively.

2. The electronic device of claim 1, wherein the first strap connector and the second strap connector are symmetrical with respect to the first axis.

3. The electronic device of claim 1, further comprising:
   a first hinge structure which couples the supporter and the front cover to be rotatable to each other,
   wherein the first hinge structure includes
   at least one first fitting hole penetrating the front cover in the left-right direction,
   at least one second fitting hole penetrating the supporter in the left-right direction and facing the first fitting hole, and
   a fitting pin inserted into the first fitting hole and the second fitting hole.

4. The electronic device of claim 1, further comprising:
   a hook positioned on a side surface of the front cover and capable of catching or hooking at least a portion of the main strap,
   wherein the hook is opened in a downward direction.

5. The electronic device of claim 4, further comprising:
   a guide part disposed below the hook on the side surface of the front cover,
   wherein the guide part is spaced apart from the hook by a predetermined interval to form an open part into which the main strap is inserted.

6. The electronic device of claim 1, further comprising:
   an auxiliary strap connector positioned on the side surface of the front cover;
   an adapter detachably coupled to the auxiliary strap connector; and
   an auxiliary strap having one end fixed to the main strap and the other end fixed to the adapter.

7. The electronic device of claim 6, wherein the auxiliary strap connector includes a latch hole penetrating a thickness, and
   wherein the adapter includes
   a first flange to which the auxiliary strap is fixed,
   a second flange facing the first flange and provided to be inserted into the latch hole, and
   a web connecting the first flange and the second flange.

8. The electronic device of claim 7, wherein the first flange includes a fixation hole to which the auxiliary strap is fixed, and
   wherein an extension direction of the fixation hole is tilted with respect to the extension direction of the web at a predetermined angle.

9. The electronic device of claim 6, wherein the auxiliary strap connector is provided to rotate at a predetermined angle around a second axis which extends in the left-right direction.

10. The electronic device of claim 9, wherein the front cover includes a concave portion positioned on the side surface,
    wherein one end of the auxiliary strap connector is rotatably connected to the side surface of the front cover,
    wherein the other end of the auxiliary strap connector includes a convex portion inserted into the concave portion and provided to move along a predetermined trajectory in response to rotation of the auxiliary strap connector, and
    wherein a shape of the concave portion corresponds to the predetermined trajectory.

11. The electronic device of claim 10, wherein the concave portion faces the convex portion and includes one surface having a pattern portion in which ridges and valleys are alternatively arranged, and
    wherein the convex portion includes a stopper provided to move along the shape of the pattern portion in contact with the pattern portion.

12. The electronic device of claim 6, further comprising:
    a first adhesive member positioned in the main strap; and a second adhesive member positioned in any one of the auxiliary strap and the adapter and provided to be detachable from the first adhesive member.

13. The electronic device of claim 12, wherein the plurality of first adhesive members is arranged in a longitudinal direction of the main strap or the plurality of second adhesive members is arranged in the longitudinal direction of the auxiliary strap.

14. The electronic device of claim 1, further comprising:
a facial pad positioned at a back of the front cover and exposing the opening,
wherein the facial pad includes
a main pad having an internal space provided adjacent to the opening in the left-right direction, and
an auxiliary pad inserted into the internal space.

15. The electronic device of claim 14, further comprising:
a second hinge structure which couples the auxiliary pad and the main pad to be rotatable to each other,
wherein the second hinge structure includes
a coupling pin penetrating the auxiliary pad in the up-down direction and having one end and the other end fixed to the main pad, and
a torsion spring coupled to the coupling pin and having one end supported on the main pad and the other end supported on the auxiliary pad to provide elastic force to the auxiliary pad when the auxiliary pad rotates.

* * * * *